US008223152B2

(12) United States Patent
Kim

(10) Patent No.: US 8,223,152 B2
(45) Date of Patent: Jul. 17, 2012

(54) APPARATUS AND METHOD OF AUTHORING ANIMATION THROUGH STORYBOARD

(75) Inventor: Jin-young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 12/425,418

(22) Filed: Apr. 17, 2009

(65) Prior Publication Data

US 2010/0118034 A1    May 13, 2010

(30) Foreign Application Priority Data

Nov. 13, 2008  (KR) ........................ 10-2008-0112732

(51) Int. Cl.
*G06T 13/00*    (2011.01)
*G09G 5/00*    (2006.01)

(52) U.S. Cl. ....................................... 345/473; 345/619

(58) Field of Classification Search .................. 345/619, 345/473

See application file for complete search history.

(56) References Cited

U.S. PATENT DOCUMENTS

2009/0024963 A1* 1/2009 Lindley et al. ................ 715/839
2010/0118034 A1* 5/2010 Kim .............................. 345/473

FOREIGN PATENT DOCUMENTS

| JP | 2003-271983 | 9/2003 |
| KR | 10-2005-0030619 | 3/2005 |
| KR | 10-2008-0069016 | 7/2008 |

* cited by examiner

*Primary Examiner* — Said Broome
*Assistant Examiner* — Wynton S Jones
(74) *Attorney, Agent, or Firm* — NSIP Law

(57) ABSTRACT

An animation authoring apparatus and method of authoring an animation including a storyboard editor to provide a storyboard editing screen, to interact with a user to edit a storyboard, and to store the edited storyboard, a parser to parse syntax of the edited storyboard, and a rendering engine to convert the edited storyboard into a graphic animation based on the parsed syntax of the edited storyboard.

15 Claims, 6 Drawing Sheets

FIG.6

Scene Number: 34
Scene Description: Minor Collision with Taxi
Place: Load
Time: Afternoon
Characters: Hanna, Taxi driver, Woman
Primary Props: Hanna's Car, Taxi

Cut 1 
Cut 2 
Cut 3 
Cut 4 

Cut 1
[Camera 3] Bust Shot, Over The Shoulder: Over Shoulder of Hanna and in Front of Taxi Driver
Taxi Driver: (Waving Finger Back and Forth) (Angrily) I Don't Understand.
How Did You Clip My Car on Such A Wide Road?

Cut 2
[Camera 1] Waist Shot: Taxi Driver (80 Degrees on Left)  Woman Exits Taxi
Woman Exits Taxi
Woman Walks Toward Hanna
Tax Driver: (Angry at Hanna) I Earn Enough Each Day to Last Me Until The Next···
Taxi Driver Stops Speaking in Surprise.

Cut 3
[Camera 2] Close Up: Hanna (Three Seconds)
[Background music] Beautiful-Girl.mp3 (Slowly)
[Sound effect] Glockenspiel Glissando (Five Seconds, Volume: Normal)
[Illumination] Spotlight on Hanna
Hanna Sweeps Hair up Apologetically

Cut 4
[Camera 3] Shoulder Shot, Over The Shoulder: Over Shoulder of Hanna and in Front of Taxi Driver
Taxi Driver: (In Love at First Sight) Are you OK?

APPARATUS AND METHOD OF AUTHORING ANIMATION THROUGH STORYBOARD

CROSS REFERENCE TO RELATED APPLICATION(S)

This application claims the benefit under 35 U.S.C. §119(a) of Korean Patent Application No. 10-2008-0112732, filed Nov. 13, 2008, the disclosure of which is incorporated herein in its entirety by reference.

BACKGROUND

1. Field

The following description relates to animation authoring. More particularly, this description relates to authoring a story based animation movie through editing of a storyboard or a rendered graphic animation itself.

2. Description of the Related Art

Animation authoring tool software has been developed for use on computers. Animation authoring tools may create a desired animation graphic through interaction with a user using a graphic user interface.

Professional knowledge about story animation directing and camerawork is necessary to use such professional authoring tools, making it difficult for ordinary users to use these tools.

Tools exist for authoring animation based on a programmable language script without a graphic interface. However, since these graphic animations must be created by programmers using a script language, it is difficult for ordinary users to understand and use the tools and because the required investment of time needed to learn the script language is beyond ordinary users.

SUMMARY

In a general aspect, an animation authoring apparatus includes a storyboard editor to provide a storyboard editing screen, to interact with a user to edit a storyboard, and to store the edited storyboard, a parser to parse syntax of the edited storyboard, and a rendering engine to convert the edited storyboard into a graphic animation based on the parsed syntax of the edited storyboard.

The animation authoring apparatus may further include a file generator to store the graphic animation as a file.

The storyboard editor may include an interface to edit the storyboard according to at least one of a text input and a graphic input from the user.

The animation authoring apparatus may further include an image output unit to display the graphic animation, the image output unit including an interface to edit the graphic animation through interaction with the user.

The animation authoring apparatus may further include a graphic animation event processor to extract content of the storyboard from the edited graphic animation and to modify the content of the storyboard.

The parser may create a screen shot image configured to be representative of a corresponding cut by parsing the syntax of the edited storyboard.

In another general aspect, an animation authoring method for use with an animation authoring apparatus may include providing by an editor a storyboard editing screen, converting by a rendering machine a result of storyboard editing performed through interaction with a user into a graphic animation in real time, outputting the graphic animation, and storing a storyboard corresponding to the graphic animation.

The animation authoring method for use with an animation authoring apparatus may further include storing by a filed generator the graphic animation as a file.

The storyboard editing screen may include an interface to receive at least one of a text input and a graphic input from the user and to edit the storyboard according to the at least one of the text input and the graphic input.

The animation authoring method for use with an animation authoring apparatus may further include parsing by a parser syntax of the storyboard edited through the interaction with the user, converting by the rendering engine the edited storyboard into the graphic animation in real time according to the result of the parsing, and outputting through an animation playing screen the graphic animation.

The converting of the result of storyboard editing into the graphic animation may further include creating by a parser a screen shot image configured to be representative of a corresponding cut by parsing syntax of the edited storyboard and reflecting the screen shot image to the storyboard.

In yet another aspect, an animation authoring method for use with an animation authoring apparatus may include displaying a graphic animation created according to a previously provided storyboard, the graphic animation including an interface to edit the displayed graphic animation through interaction with a user, extracting content of the storyboard from the edited graphic animation, and editing the content of the storyboard.

The animation authoring method for use with an animation authoring apparatus may further include storing by a storyboard editor the edited storyboard.

The animation authoring method for use with an animation authoring apparatus may further include storing by a file generator the graphic animation as a file.

The extracting of the content of the storyboard and editing of the content of the storyboard may include creating by a parser a screen shot image that is configured to be representative of a corresponding cut by parsing syntax of the storyboard.

Other features and aspects will be apparent from the following description, drawings, and claims.

BRIEF DESCRIPTION OF THE DRAWINGS

FIG. 6 is a diagram illustrating an exemplary storyboard including a screenplay.

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

Figure 1:
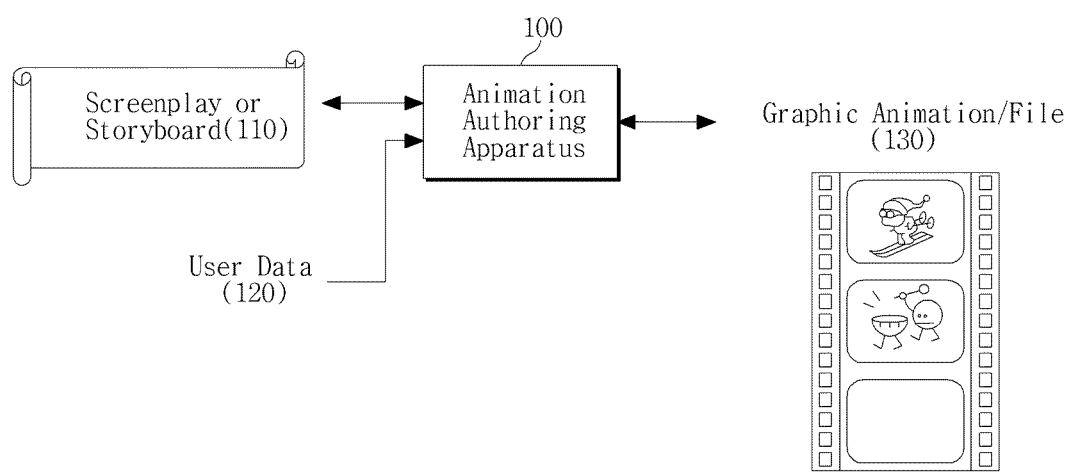
FIG. 1 is a diagram illustrating use of an exemplary animation authoring apparatus.

FIG. 1 is a diagram illustrating use of an exemplary animation authoring apparatus. An animation authoring apparatus 100 receives a screenplay or storyboard 110 (hereinafter "storyboard") and creates a graphic animation or a file 130 (hereinafter "graphic animation"). The animation authoring apparatus 100 may receive user data 120 selectively.

The storyboard 110 is commonly used in dramas or movies (hereinafter "movie") and may be input to the animation authoring apparatus 100 in a text format. In this case, persons appearing in the movie (i.e., story characters) may be set by a graphic user interface (GUI) through a graphic icon or in a text format. Directing operation of predefined camerawork, illumination, and the like may be included. An animation, such as motion and expression of the characters may be generated based on a list of predefined commands. New commands may be added by combining the predefined commands or directly by a user.

The graphic animation authoring may be performed using a natural language, and thus, the animated motions or expressions may be expressed based on using the natural language. In addition, a sound effect, a visual effect, or a computer graphic effect may be based on the predefined word list, produced by combining the predefined commands, or added by the user.

The storyboard 110 may be stored as a text, a script language, or a binary file.

The user data 120 is multimedia data added by the user, which may include audio, video, or image data. The user data 120 is not data inserted by editing the storyboard 110, but is multimedia data added by the user's selection.

The animation authoring apparatus 100 receives the storyboard 110 or the user data 120, generates three-dimensional animation real-time rendering, and produces the graphic animation 130. That is, the animation authoring apparatus 100 interprets the storyboard 110 in real time and performs graphic data processing including characters' animated motion and camerawork and/or process characters' lines or narration using a text to speech (TTS) engine.

In this case, the created graphic animation may be created and stored in a widely used moving-image format, such as wmv, avi, or mp4.

Figure 2:
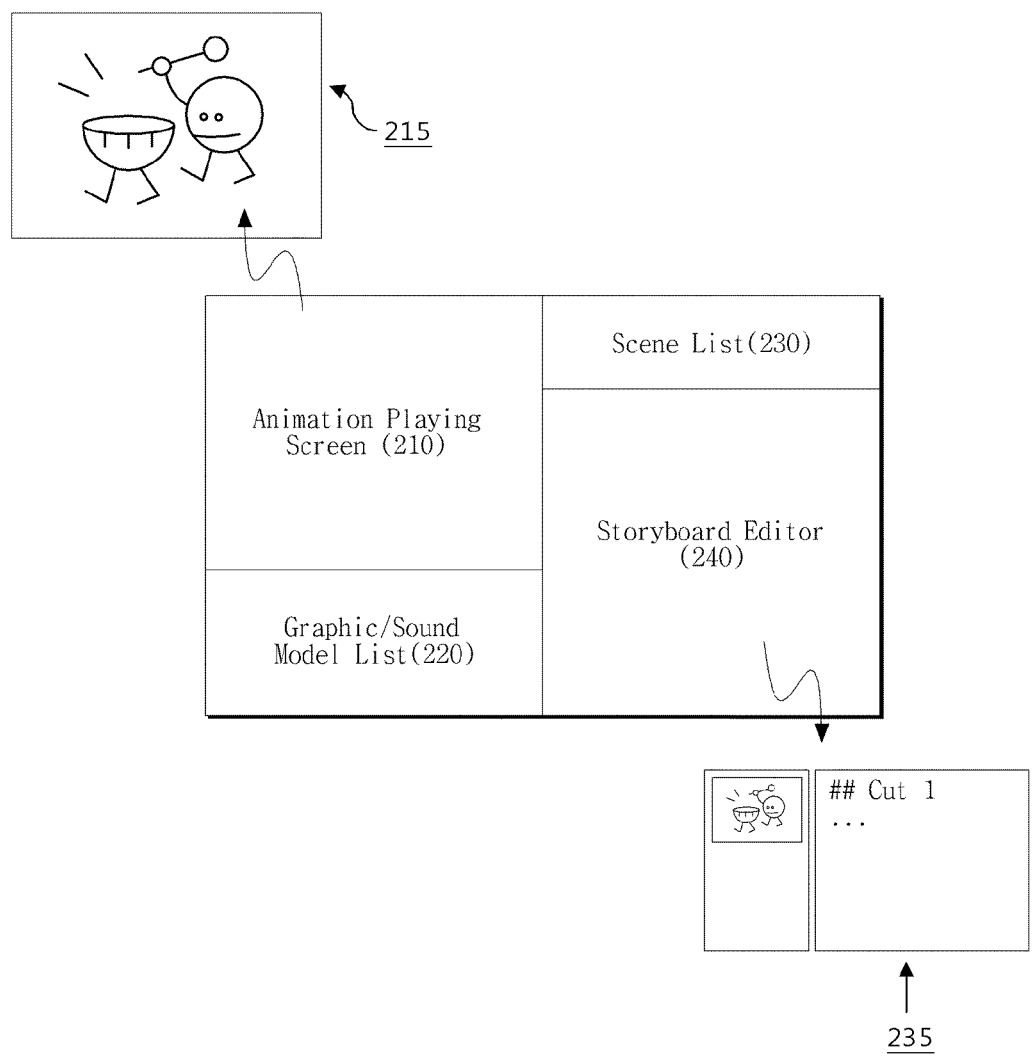
FIG. 2 is a diagram illustrating an exemplary user interface of an animation authoring apparatus including a storyboard editor.

FIG. 2 illustrates an exemplary user interface of an animation authoring apparatus. A screen of the animation authoring apparatus includes an animation playing screen 210, a graphic/sound model list 220, a scene list 230, and a storyboard editor 240.

The animation playing screen 210 displays a graphic animation 215 that is created by rendering a content of a storyboard 110. The animation playing screen 210 may provide a tool and parameters for directly editing or modifying the presented graphic animation. When the graphic animation is modified or edited by the user through the animation playing screen 210, a content of the storyboard 110 of the modified/edited graphic animation may be confirmed using the storyboard editor 240.

When the storyboard 110 is stored in either a script or a binary format, the edited content in the graphic animation is stored in a file of the script or the binary format.

The graphic/sound model list 220 provides a list of selectable models of characters, props, and backgrounds appearing in the storyboard 110. The graphic/sound model list 220 also may provide a list of models of sound effects, visual effects, and/or computer graphic effects.

The scene list 230 is a screen to show a list of scenes of the graphic animation. Several scenes may be included in a story animation, and the scene list 230 may show a list of scene numbers, screen shot images, and titles. Here, the screen shot refers to an image that is capable of representing several cuts of the scene. When one scene is selected from the scene list 230, a storyboard 110 of the selected scene 235 may be identified and edited on the storyboard editor 240.

The storyboard editor 240 enables the user to modify or edit the storyboard 110 of each or all of the scenes through text input. The content edited through the storyboard editor 240 may be played and confirmed on the animation playing screen 210.

Figure 3:
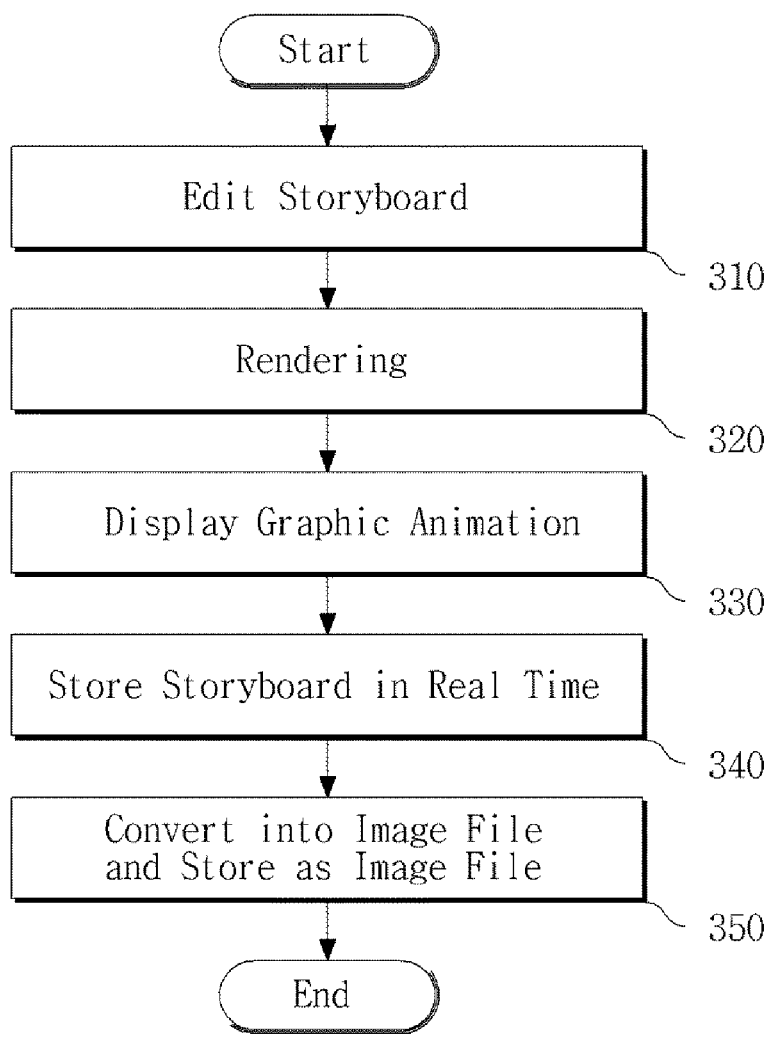
FIG. 3 is a flowchart illustrating an exemplary animation authoring method.

FIG. 3 illustrates an exemplary animation authoring method. When a storyboard editing screen is provided, a user edits a storyboard through the storyboard editing screen (310). The storyboard editing screen may provide an interface to receive text or graphic input from the user to edit the storyboard 110 according to the input. In other words, backgrounds, characters, props, etc. of the screen may be added and edited using the graphic/sound model list 220. The storyboard 110 may be edited in a text format through the storyboard editor 240. Editing the storyboard 110 may include directing indications of a camera, an illumination, effects, etc., in addition to characters' lines.

The result of editing the storyboard through interaction with the user is subjected to rendering (320) and converted into a graphic animation in real time and output (330). That is, syntax of the storyboard edited through the interaction with the user may be parsed, real-time conversion into the graphic animation may be performed according to the parsing result, and the graphic animation may be output. In this process, a screen shot image that is capable of representing a corresponding cut may be created by parsing the syntax of the storyboard and reflected to the storyboard.

The storyboard corresponding to the output graphic animation is then stored (340). The graphic animation may be stored as a file according to a user's selection (350). The file may have any of generally used formats, such as .avi, .wmv, .mp4, etc.

An example of parsing the syntax of the storyboard is described in further detail below.

A user-produced storyboard 110 may be parsed in real time. In this case, the storyboard 110 may be parsed in a predefined unit, such as a line or a sentence. It is assumed that there is one unit of per subject (i.e., a directing element of an animation within the parsed unit). The syntax is parsed and natural language processing is performed to extract the subject. The extracted subject may be any of a character, an accessory, a camerawork, an illumination, an image object, a video object, a text object, a sound effect, a visual effect, etc.

When the subject is a character including the character's lines in the storyboard 110, an animation script corresponding to the character's lines is produced. When the character includes a motion, a determination is made as to whether there is a direction or object of the motion, and an animation script including the same is produced. The direction or object of the motion includes props, other characters, and coordinates. When the character includes an expression, content for the character's expression is parsed.

When the subject is an accessory expressed by a location in the screenplay, content for a location setting of the accessory is parsed. When the accessory includes a motion, the accessory's motion is parsed. When there is an object or direction of the motion, the object or direction of the motion also is parsed.

When the subject is a camerawork, a keyword is parsed. The keyword may correspond to a type of the camerawork. The camerawork may include a close-up, a shoulder shot, etc. In this case, a subject and direction of the camerawork are parsed.

When the subject is an illumination, a keyword is parsed. The keyword may correspond to a type of the illumination. The illumination may include natural light, such as afternoon sunlight, dawn light, and night light, artificial light, such as a fluorescent lamp and an incandescent lamp, and partial illumination, such as a spotlight. When there is a partially illuminated object, the object is parsed.

When the subject is an image object, a play command, such as "show" or "hide" is parsed. An image file path is confirmed.

When the subject is a video/sound object, a play command (e.g., play, stop, pause, repeat, etc.) is parsed. A path of a video/sound file is confirmed.

When the subject is a text object, a determination is made as to whether there is a play command (e.g., text animation) and the text object is confirmed.

When the subject is a predefined sound, a keyword is parsed to determine whether the predefined sound is on the list.

When the subject is a predefined visual effect, a keyword is parsed to determine whether the predefined visual effect is on the list.

Figure 4:
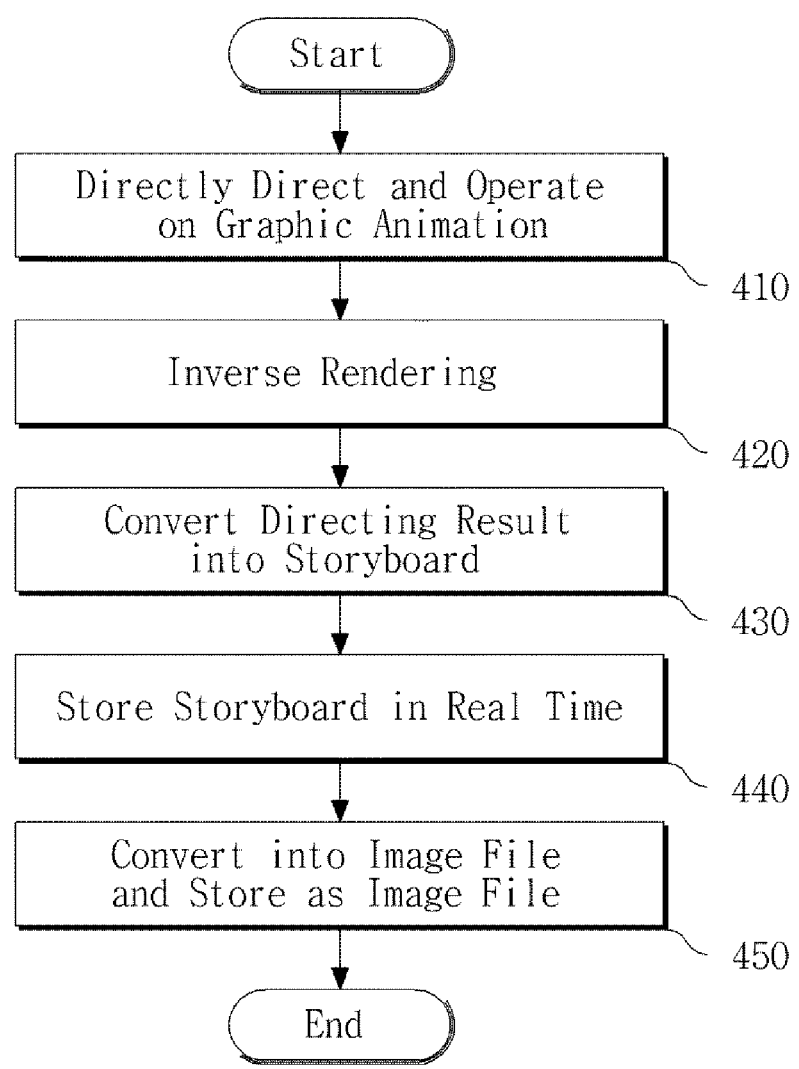
FIG. 4 is a flowchart illustrating another exemplary animation authoring method.

FIG. 4 illustrates an exemplary animation authoring method.

When a graphic animation created according to a previously provided storyboard is displayed on the animation playing screen 210, it is edited through interaction with a user to perform a directing operation (410). The animation playing screen 210 may provide an interface for receiving a text input or a graphic input from the user, as described above with respect to FIG. 3. In other words, backgrounds, characters, props, etc. of the screen may be added and edited using the graphic/sound model list 220.

The content of the storyboard is then extracted from the edited and directed graphic animation (420) and the storyboard is generated (430). That is, inverse rendering may be performed on the graphic animation to convert the user-operated content into a storyboard format. In this process, syntax of the storyboard may be parsed to create a screen shot image that is capable of being representative of a corresponding cut.

The converted storyboard is stored in real time (440) and may be additionally converted/stored as an image file according to the user's selection (450).

Figure 5:
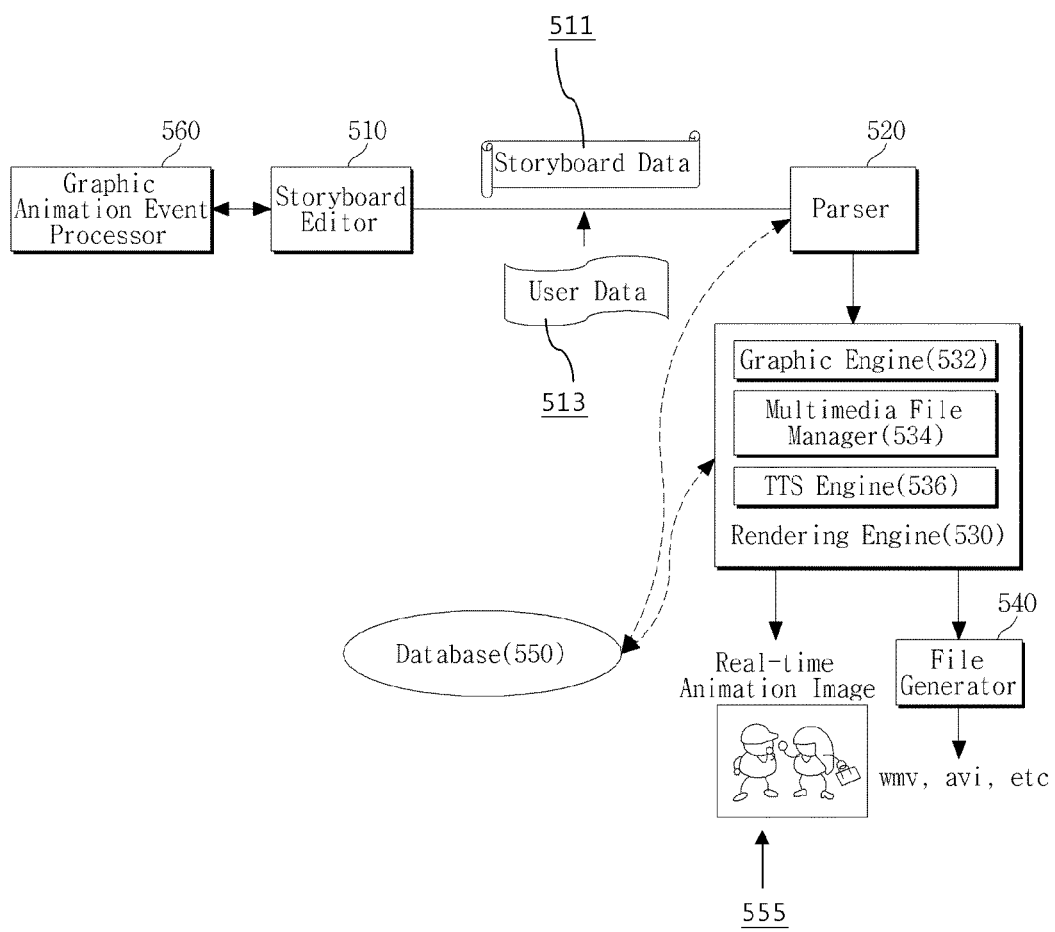
FIG. 5 is a block diagram illustrating an exemplary animation authoring apparatus.

FIG. 5 illustrates another exemplary animation authoring apparatus.

Referring to FIG. 5, an animation authoring apparatus includes a storyboard editor 510, a parser 520, and a rendering engine 530. The storyboard editor 510 provides a storyboard editing screen and stores a result of editing a storyboard through interaction with a user. The storyboard editor 510 may provide an interface for editing the storyboard according to text input or graphic input from the user. That is, the storyboard editor 510 delivers storyboard data 511 edited by the user to the parser 520. User data 513 may be added, if necessary.

The parser 520 parses syntax of the edited storyboard. An example of parsing the syntax has been described above. The parser 520 may parse the syntax of the storyboard 110 and may create a screen shot image that is representative of a corresponding cut.

The rendering engine 530 converts the edited storyboard into a graphic animation based on the parsing result from the parser 520. Specifically, the rendering engine 530 may include a graphic engine 532 to create a three-dimensional graphic image, a multimedia file manager 534 to manage audio/video/image data and to combine the data with the graphic image created by the graphic engine 532, and a TTS engine 536 to convert text data into speech data. The rendering engine 530 may refer to data of characters, props, etc. stored in a database 550.

Thus, the rendering engine 530 creates a real-time graphic animation 555. Meanwhile, a file generator 540 stores the converted graphic animation as a file. The file may have any of a variety of widely used formats, such as .avi, .wmv, .mp4, etc.

The converted graphic animation from the rendering engine 530 may be displayed through an image output unit (not shown). That is, the graphic animation may be output through the animation playing screen 210 of FIG. 2. The image output unit provides an interface to edit the output graphic animation through interaction with the user. In other words, a graphic animation event processor 560 may extract the content of the storyboard from the edited graphic animation and may modify the content of the storyboard.

FIG. 6 illustrates an example of a storyboard including a screenplay.

The storyboard includes scene information 610, a screen shot 620 for each cut, and a screenplay 630. The scene information 610 may include information constituting a scene, such as a scene number, content, places, time, characters, props, etc. The screen shot 620 may show a screen shot selected by a user at a desired point in time through image preview. Screen shots may be stored for each automatically determined time, and a screen shot that is suitable by policy may be selected from the stored screen shots in consideration of a total play time of a corresponding cut. The screenplay 630 may show characters' lines, as well as indications of motions of the characters, camerawork, illumination, and other directing effects.

Ordinary users can easily author graphic animations with only simple knowledge about graphic animation authoring and the animation authoring apparatus. The user can also edit the storyboard based on a natural language, and may produce or modify the content while simultaneously confirming graphic animations and story progressing.

Furthermore, the user can confirm a rough image and story through the graphic animation using only a scenario prior to actual photographing to predict the photographing result.

The above-described apparatuses and methods may be recorded, stored, or fixed in one or more computer-readable media that includes program instructions to be implemented by a computer to cause a processor to execute or perform the program instructions. The media also may include, independently or in combination with the program, instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and/or methods described above.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An animation authoring apparatus comprising:
a storyboard editor to provide a storyboard editing screen, to interact with a user to edit a storyboard, and to store the edited storyboard, wherein the storyboard comprises scene information, a screen shot for each cut, and a screenplay, all being displayed on the storyboard at the same time;
a parser to parse syntax of the edited storyboard; and
a rendering engine to convert the edited storyboard into a graphic animation based on the parsed syntax of the edited storyboard.

2. The apparatus of claim 1, further comprising a file generator to store the graphic animation as a file.

3. The apparatus of claim 1, wherein the storyboard editor comprises an interface to edit the storyboard according to at least one of a text input and a graphic input from the user.

4. The apparatus of claim 1, further comprising an image output unit to display the graphic animation, the image output unit including an interface to edit the graphic animation through interaction with the user.

5. The apparatus of claim 4, further comprising a graphic animation event processor to extract content of the storyboard from the edited graphic animation and to modify the content of the storyboard.

6. The apparatus of claim 1, wherein the parser creates a screen shot image that represents a corresponding cut by parsing the syntax of the edited storyboard.

7. An animation authoring method for use with an animation authoring apparatus, the method comprising:
providing by an editor a storyboard editing screen to edit a storyboard, wherein the storyboard comprises scene information, a screen shot for each cut, and a screenplay, all being displayed on the storyboard at the same time;
converting by a rendering machine parsed syntax of a storyboard edited through interaction with a user, into a graphic animation in real time;
outputting the graphic animation; and
storing a storyboard corresponding to the graphic animation.

8. The method of claim 7, further comprising:
storing by a filed generator the graphic animation as a file.

9. The method of claim 7, wherein the storyboard editing screen comprises an interface to receive at least one of a text input and a graphic input from the user and to edit the storyboard according to the at least one of the text input and the graphic input.

10. The method of claim 7, further comprising:
parsing by a parser syntax of the storyboard edited through the interaction with the user;
converting by the rendering engine the edited storyboard into the graphic animation in real time according to the result of the parsing; and
outputting the graphic animation through an animation playing display.

11. The method of claim 7, wherein the converting of the result of storyboard editing into the graphic animation further comprises creating by a parser a screen shot image that represents a corresponding cut by parsing syntax of the edited storyboard and reflecting the screen shot image to the storyboard.

12. An animation authoring method for use with an animation authoring apparatus, the method comprising:
converting by a rendering machine parsed syntax of a storyboard edited through interaction with a user, into a graphic animation;
displaying the graphic animation created according to the storyboard, the graphic animation including an interface to edit the displayed graphic animation through interaction with a user;
extracting content of the storyboard from the edited graphic animation; and
editing the content of the storyboard,
wherein the storyboard comprises scene information, a screen shot for each cut, and a screenplay, all being displayed on the storyboard at the same time.

13. The method of claim 12, further comprising:
storing by a storyboard editor the edited storyboard.

14. The method of claim 12, further comprising:
storing by a file generator the graphic animation as a file.

15. The method of claim 12, wherein the extracting of the content of the storyboard and editing of the content of the storyboard comprises creating by a parser a screen shot image that represents that a corresponding cut by parsing syntax of the storyboard.

* * * * *